Nov. 21, 1950      L. P. BRETT      2,531,349
AIR DUCT CONSTRUCTION
Filed March 3, 1948      2 Sheets-Sheet 1
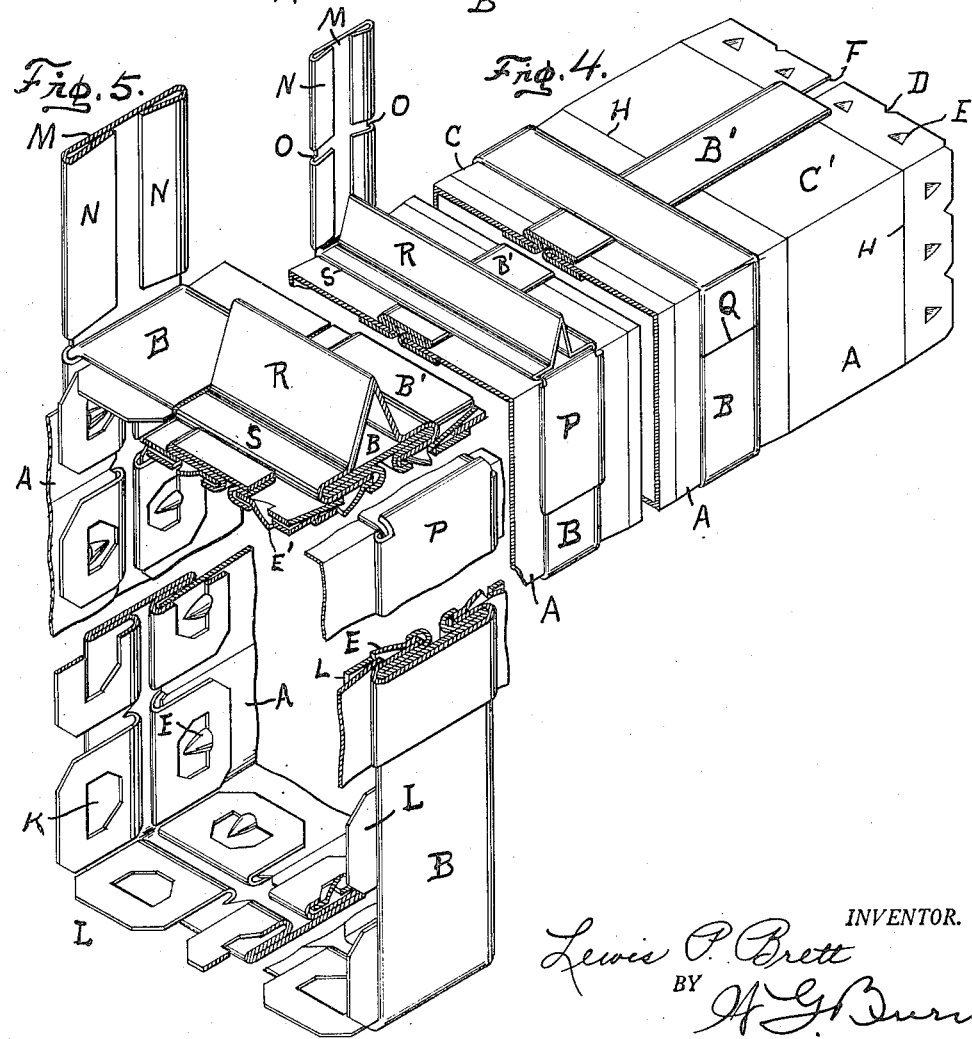

Nov. 21, 1950 — L. P. BRETT — 2,531,349
AIR DUCT CONSTRUCTION
Filed March 3, 1948 — 2 Sheets-Sheet 2
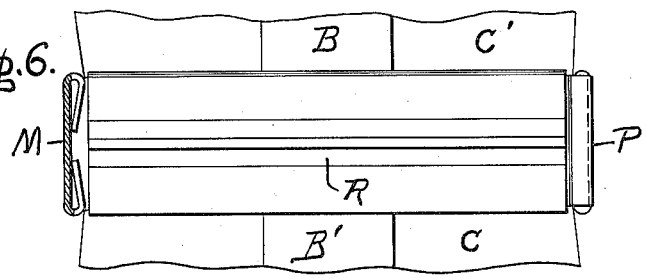
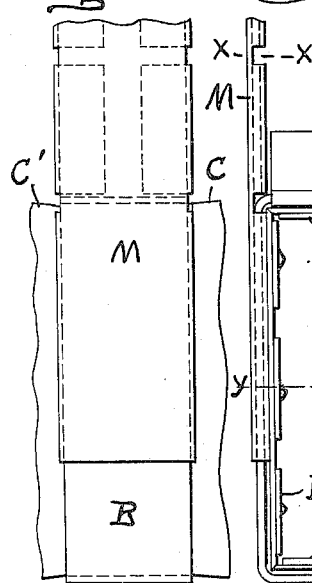
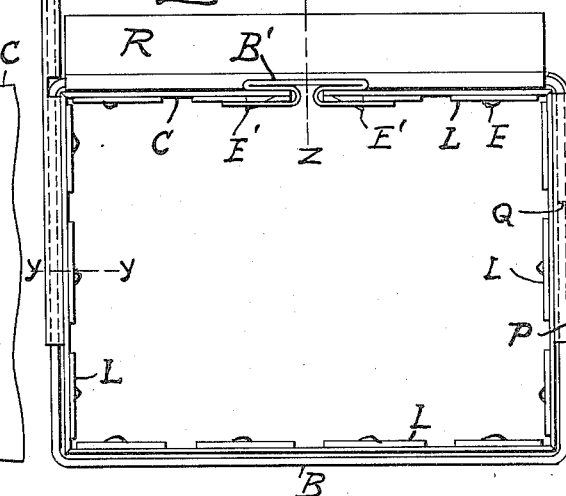
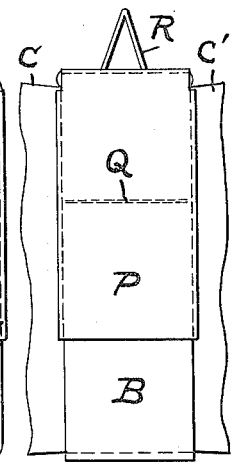
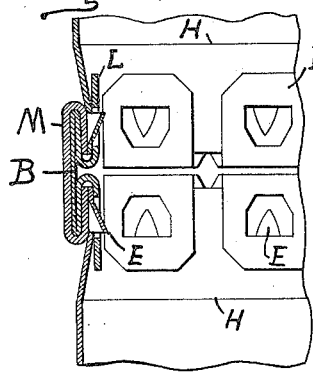
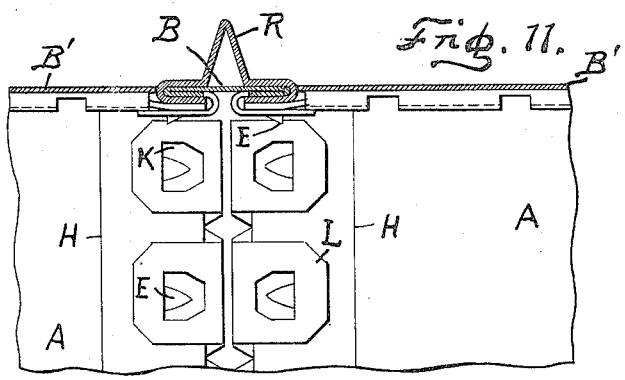
INVENTOR.
Lewis P. Brett
BY A. G. Burns
Attorney.

Patented Nov. 21, 1950

2,531,349

UNITED STATES PATENT OFFICE 2,531,349

AIR DUCT CONSTRUCTION

Lewis P. Brett, Fort Wayne, Ind., assignor to A. B. C. Sheet Metal Co., Inc., a corporation of Indiana Application March 3, 1948, Serial No. 12,701

9 Claims. (Cl. 285—185)

1

This invention relates to improvements in metal parts for constructing air ducts such as are used in heating and ventilating systems.

Customarily, metal air ducts are made up complete in a shop in accordance with furnished dimensions, in readiness for installation in a building more or less remote from the shop where constructed, necessitating transportation to the situs. Such prefabricated air ducts generally are unwieldy and frequently occasion difficulty in fitting the various sections together during installation.

One of the objects of the instant invention is to provide a practical knockdown air duct constituted of various parts that are transported in compact form to be subsequently fabricated by an artisan into ducts of various dimensions suitably to fit into place where required.

Another object of the invention is to afford an air duct formed of a series of tubular metal sections, and connectors therefor, constructed so that air tight joints are effected between the abutting edges of the metal sheets forming each section, and between the opposing ends of said sections.

And a further object of the invention is to provide means readily attachable to the connectors by which to support and strengthen the series of connected sections when assembled.

Other objects and advantages of the invention appear in the following description.

An illustrative embodiment of the invention is shown in the accompanying drawings, in which:

Fig. 1 is a fragmentary plan view of a group of sheet metal strips as initially shaped through which a pair of ducts and their connectors are formed;

Fig. 2 is a similar plan view of the strips shown in Fig. 1 with the connector strip bent into shape for use;

Fig. 3 is a fragmentary elevational view of the ducts secured together by the connector, shown in section;

Fig. 4 is a fragmentary perspective view of several ducts provided with connectors for securing their abutting edges in place and other connectors for securing the opposing ends of the ducts together and including also means for supporting and stiffening the assemblage of ducts, portions being broken away and in section;

Fig. 5 is another fragmentary perspective view, drawn to an increased scale, of the joint formed in connecting the ducts together;

Fig. 6 is a fragmentary top plan view of the joint between the duct sections, the supporting

2 member being in section on the line $x$—$x$ of Fig. 7;

Fig. 7 is an end elevational view of the duct assemblage;

Fig. 8 is a fragmentary side elevational view projected from Fig. 7;

Fig. 9 is another fragmentary side elevational view projected from Fig. 7;

Fig. 10 is a fragmentary plan view in section on the line $y$—$y$ of Fig. 7; and Fig. 11 is a fragmentary elevational view in section on the line $z$—$z$ of Fig. 7.

The illustrative embodiment of the invention consists of an air duct formed of a series of similar sections A arranged longitudinally with respect to each other in sequence, their opposing ends being encompassed and connected by connectors B.

The sections are formed of sheet metal strips C—C' that are initially prepared to have uniform width and of a length selected according to the size or capacity of the duct to be formed. The strips have formed in each side thereof a series of notches D at equally spaced intervals, and adjacent each side of the strips are formed a series of protrusions constituting latches E, spaced apart from each other, and located alternately with respect to said notches. The sections A are formed by folding the strips into rectangular formation so the ends of the strips are oppositely disposed, as indicated in Fig. 4 at F.

Preferably, the strips C—C' have parallel marks or scores G (Fig. 1) that extend to the corresponding opposite notches D in the sides of the strips, the notches and scores being for the purpose of aiding the artisan in cutting the strips to desired lengths and in folding the strips when shaping the duct sections. Other marks or scores H (Fig. 2) are made lengthwise on the strips C—C' that extend parallel with and spaced suitably distant from the corresponding sides of the strips along which the end margins of the duct sections are bent slightly inward to reduce the dimensions of the ends of the sections thus to facilitate insertion of their ends into the connectors B (Fig. 3).

The strips I (Fig. 1) for making the connectors as initially shaped are of uniform width and of any desired length, each side of the strip having made therein a series of slots J, equally spaced apart from each other, and a corresponding series of latch openings K intervening between the slots. The marginal portions of the strip, having the latch openings K, are folded backwardly over the midportion and then outwardly to form ears L, the arrangement being such that when the ends of the sections A are inserted between the backwardly and outwardly extending folds of the connector, the latches E have locking engagement with the ears through the latch openings K therein. The slots J permit the ears to be folded, facilitates severing of the connector strip in desired lengths and folding of the connector to fit around the opposing ends of the sections as they are assembled.

The opposing ends F of the strips C—C' (Fig. 4) that form the sections A are secured in place by other connectors B' that have locking engagement with latches E' that project from the abutting end margins of the duct strips (Fig. 7.)

As a supporting means for the air duct there is provided a metallic strip M (Figs. 4-5) having opposing inturned flanges N that have opposite transverse slots O at suitable intervals permitting severance of the strip readily into desired lengths. The supports are applied to the connectors B by sliding its flanges between the connector and the adjacent outer walls of the duct sections. A portion of the supporting strips continue upwardly beyond the connector and are anchored by any suitable means to the building structure (not shown) where the duct is installed. These strips are also used as covers P by applying a suitable length of the strip to the connector where the ends thereof abut, as indicated by Q (Fig. 4). In this manner leakage of air from the duct is circumvented.

Another feature of the structure is a stiffening cleat R, formed of another metallic strip having outwardly extending folded flanges S, the midportion of the strip being V-shaped. The cleats are attached to the connectors by sliding them astride the corresponding connectors into the required position thereon before the connectors are bent into shape for locking engagement with the duct sections.

In utilizing the invention the strips C—C' for making the duct sections A are initially prepared flat and of sufficient or more than sufficient length to form the walls of the sections to be installed, so that an artisan may readily cut from the strip, by use of ordinary shears, any length thereof to suit the size of the duct sections as required.

The connectors are prepared in convenient lengths for transport and are subsequently severed by use of shears to suitable lengths and bent to fit the duct sections to which they are applied. The strips M, for the supporting means and covers P, and the cleats R are likewise initially prepared in convenient lengths and cut to proper lengths as they are applied to the duct where installed.

By preparing the various parts of the structure separately in suitable sizes for transport and subsequent assemblage by an artisan at the place of installation effects an economy as well as convenience in shaping and fitting the air duct to suit the requirements.

Variations from the particular construction above disclosed may be resorted to by the exercise of skill in the art without departure from the spirit or scope of the invention.

What I claim is:

1. An air duct structure consisting of a series of alined duct sections formed of folded sheet metal strips provided with protruding latches arranged in a series adjacent each end of the duct sections and along the marginal opposing ends of the strips of which said sections are formed, connectors for coupling the opposing ends of said sections having engagement with the corresponding latches on the end portions thereof, other similar connectors securing the opposing marginal ends of the strips of which the sections are formed, supporting means for the duct having inturned flanges provided with intermittent slots, and engageable selectively with the connectors, and cleats formed of other strips having outwardly extending backfolded flanges by which the cleats are selectively secured to said connectors.

2. An air duct consisting of alined duct sections formed of folded sheet metal strips, the lateral marginal portions of which have protuberances constituting latches, the opposing end marginal portions of the strips having similar latches, a connector for coupling the ends of said sections formed of another strip, the lateral margins of which are provided with folded perforated ears that have locking engagement with the corresponding latches when said sections and the connector are assembled, other similar connectors for coupling the opposing ends of the duct strips by engagement with the latches thereon, a third strip the sides of which are inturned and have engagement with said connectors by which to support the duct, or cover the abutting ends of the connectors, and a cleat formed of sheet metal having inturned opposite flanges disposed exteriorly astride the connectors selectively where needed to stiffen the duct structure.

3. An air duct consisting of alined duct sections formed of folded sheet metal strips, the lateral marginal portions of which have protuberances constituting latches, the opposing end marginal portions of the strips having similar latches, a connector for coupling the ends of said sections formed of another strip, the lateral margins of which are provided with backwardly folded perforated ears that have locking engagement with the corresponding latches when said sections and the connector are assembled, and other similar connectors for coupling the opposing ends of the duct strips by engagement with the latches thereon.

4. An air duct consisting of alined duct sections each formed of a folded sheet metal strip the lateral and opposing end portions of which have protuberances constituting latches, connectors formed of other sheet metal strips the opposite sides of which have backwardly folded ears provided with openings therein for engagement with the corresponding latches, whereby said sections are coupled together, and other similar connectors for securing in place the opposing ends of the strips for said sections.

5. An air duct construction consisting of alined sections formed of sheet metal, the end portions of which are provided with latches formed thereon, and connectors for coupling said sections sequentially end to end, said connectors consisting of sheet metal strips the opposite marginal edges of which are folded backwardly and shaped to provide outwardly folded perforated ears, the connectors being bent to encompass the opposing ends of said sections correspondingly and secure the adjacent sections together by having locking engagement with said latches.

6. The construction as defined in claim 5 including another sheet metal strip having laterally inturned flanges exteriorly engageable with said connectors to provide supporting means for said sections.

7. In knockdown air duct construction, sheet metal strips the marginal edges of which are provided with protrusions constituting latch members, said strips being adapted to be folded to form duct sections, and other strips the lateral margins of which are folded backwardly over the midportions thereof, provided with outwardly extending perforated ears, and constituting connectors for joining the opposing ends of said sections and securing the opposing ends of the first-mentioned strips together, said ears having locking engagement with the corresponding latch members.

8. In a knockdown air duct construction, sheet metal strips having spaced parallel lateral scores and longitudinal scores parallel with and adjacent the sides thereof and provided with a series of protrusions adjacent each side of the strip constituting latch members, said strips being adapted to be shaped to form air duct sections, and other strips having backwardly folded sides provided with outwardly extending perforated ears adapted to form connectors for coupling the opposing ends of said sections when alined, by locking engagement of the ears with said latch members.

9. In a knockdown air duct construction, sheet metal strips having spaced parallel lateral scores and provided with a series of protrusions adjacent each side of the strip constituting latch members, said strips being adapted to be shaped to form air duct sections, and other strips having backwardly folded sides provided with outwardly extending perforated ears adapted to form connectors for coupling the opposing ends of said sections when alined, by locking engagement of the ears with said latch members.

LEWIS P. BRETT.

REFERENCES CITED

The following references are of record in the file of this patent:

UNITED STATES PATENTS

| Number | Name | Date |
| --- | --- | --- |
| 1,185,400 | Hefney | May 30, 1916 |
| 1,368,985 | Storie | Feb. 15, 1921 |
| 1,661,674 | Osborn | Mar. 6, 1928 |
| 2,396,086 | Conaway | Mar. 5, 1946 |